United States Patent
Preston et al.

(10) Patent No.: US 9,441,560 B1
(45) Date of Patent: *Sep. 13, 2016

(54) APPARATUS FOR REDUCING ENGINE EMISSIONS UTILIZING MULTIPLE TYPES OF FUELS

(71) Applicant: Cleanflex Power Systems, LLC, Lincoln, NE (US)

(72) Inventors: Ronald A. Preston, Firth, NE (US); Robert Dickey, Laurel, NE (US); Kevin E. Kenney, Seward, NE (US)

(73) Assignee: CLEANFLEX POWER SYSTEMS, LLC, Lincoln, NE (US)

( * ) Notice: Subject to any disclaimer, the term of this patent is extended or adjusted under 35 U.S.C. 154(b) by 124 days.

This patent is subject to a terminal disclaimer.

(21) Appl. No.: 14/478,410

(22) Filed: Sep. 5, 2014

Related U.S. Application Data

(63) Continuation of application No. 12/755,163, filed on Apr. 6, 2010, now Pat. No. 8,826,888.

(60) Provisional application No. 61/211,977, filed on Apr. 6, 2009.

(51) Int. Cl.
*F02D 41/30* (2006.01)
*F02D 41/00* (2006.01)
*F02M 25/00* (2006.01)

(52) U.S. Cl.
CPC ....... *F02D 41/0025* (2013.01); *F02D 41/3094* (2013.01); *F02M 25/00* (2013.01)

(58) Field of Classification Search
CPC .. F02D 19/0655; F02D 19/084; F02D 35/02; F02D 41/3094; F02D 41/0025; F02M 61/14; F02M 61/145; F02M 69/046
USPC ........ 123/470, 299, 300, 27 GE, 25 A, 25 C, 123/525, 431, 575, 435; 701/103–105, 111
See application file for complete search history.

(56) References Cited

U.S. PATENT DOCUMENTS

| | | | |
|---|---|---|---|
| 5,832,880 A | 11/1998 | Dickey | |
| 5,890,459 A | 4/1999 | Hedrick et al. | |
| 6,460,491 B1 | 10/2002 | Stanglmaier et al. | |
| 6,843,219 B2* | 1/2005 | Matsuda | F02M 35/10032 123/184.21 |
| 6,947,830 B1 | 9/2005 | Froloff et al. | |
| 7,104,236 B2* | 9/2006 | Ishikawa | F02B 61/02 123/184.31 |
| 7,237,522 B2* | 7/2007 | Fukami | F02B 17/00 123/184.24 |
| 7,270,089 B2 | 9/2007 | Wong | |
| 7,284,506 B1 | 10/2007 | Sun et al. | |
| 7,409,926 B2 | 8/2008 | Sun et al. | |
| 7,597,090 B2 | 10/2009 | Hashimoto et al. | |
| 7,765,986 B2* | 8/2010 | Cho | F02M 35/10085 123/470 |
| 8,826,888 B1* | 9/2014 | Kenney | F02B 7/00 112/25 C |

(Continued)

FOREIGN PATENT DOCUMENTS

| | | |
|---|---|---|
| CA | 2524146 | 3/2006 |
| GB | 2457925 | 9/2009 |

*Primary Examiner* — Hai Huynh
(74) *Attorney, Agent, or Firm* — Advent, LLP

(57) ABSTRACT

The present disclosure is a method and apparatus for reducing engine emissions utilizing multiple types of fuels. Apparatus for reducing engine emissions may include a controller which may control delivery of a first fuel to be combined with a second fuel at a combustion chamber of an engine. Controller may be configured to provide a proper amount of the first fuel at the correct point in an engine cycle based upon a current engine performance data.

19 Claims, 9 Drawing Sheets

(56) References Cited

U.S. PATENT DOCUMENTS

| | | |
|---|---|---|
| 2007/0131180 A1 | 6/2007 | Roehm |
| 2011/0010074 A1 | 1/2011 | Hung et al. |
| 2011/0088654 A1 | 4/2011 | Courtoy et al. |
| 2011/0088656 A1 | 4/2011 | Simmons et al. |
| 2011/0288751 A1 | 11/2011 | Kurtz |
| 2013/0104850 A1 | 5/2013 | Long et al. |
| 2015/0040858 A1* | 2/2015 | Malhotra ........... F02M 21/0275 123/299 |

* cited by examiner

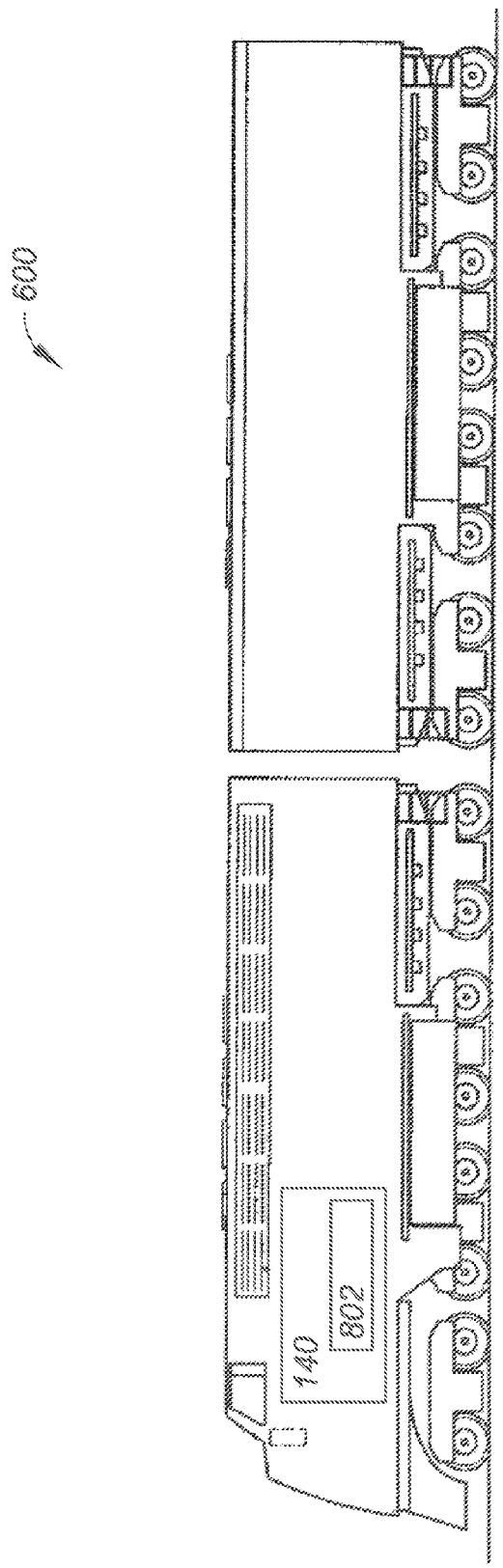

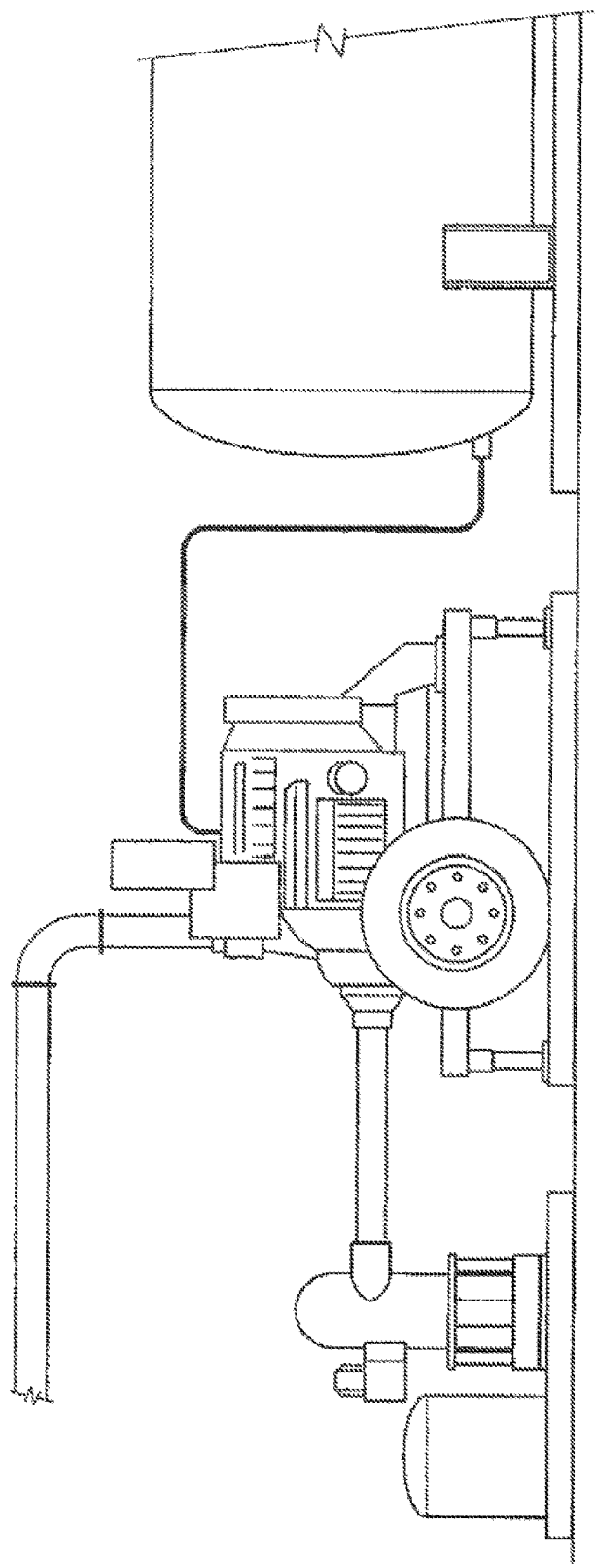

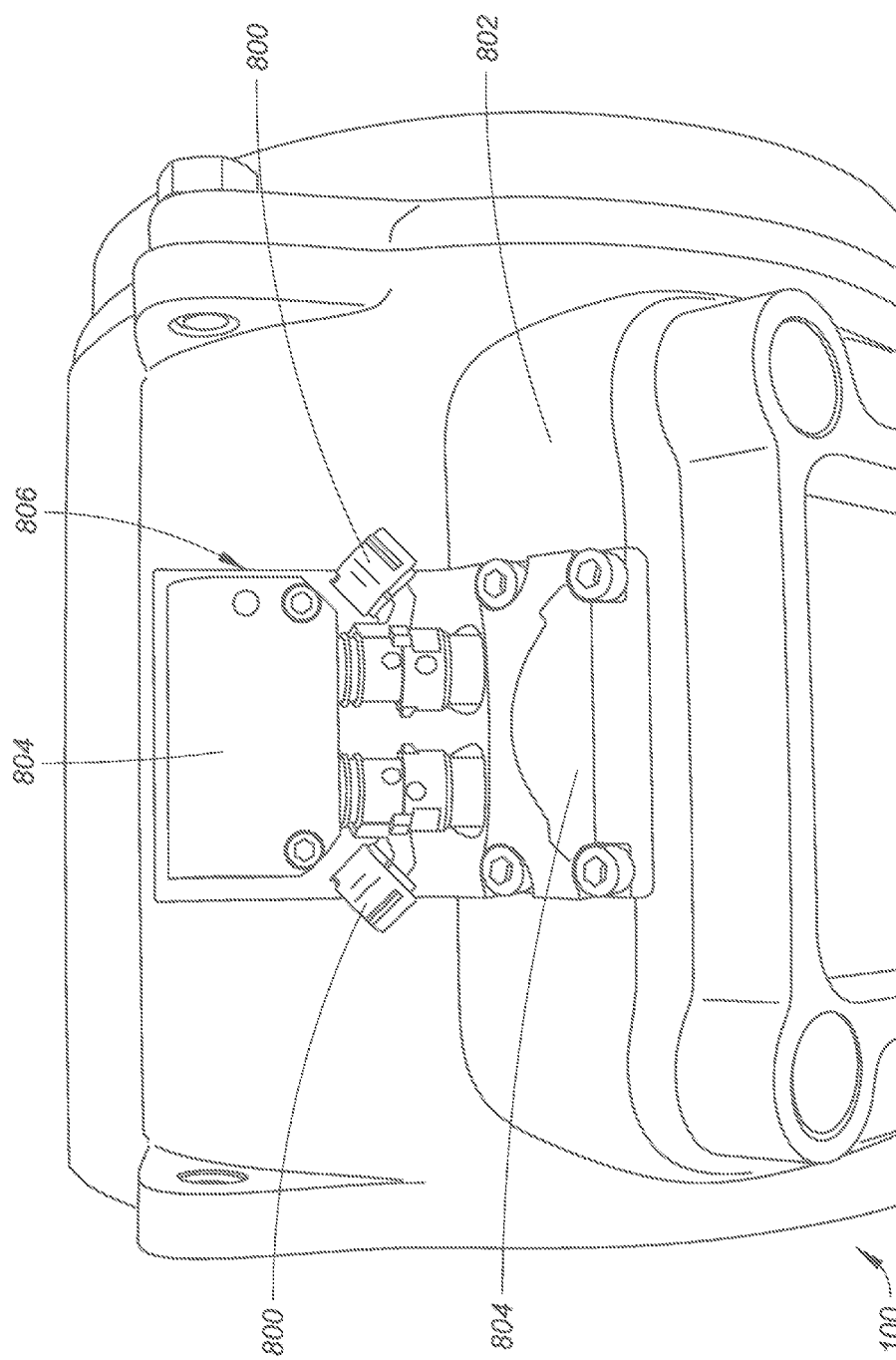

APPARATUS FOR REDUCING ENGINE EMISSIONS UTILIZING MULTIPLE TYPES OF FUELS

CROSS REFERENCE TO RELATED APPLICATION

The present application claims the benefit under 35 U.S.C. §119 of U.S. Patent Application Ser. No. 61/211,977 filed Apr. 6, 2009. The present application claims the benefit under 35 U.S.C. §120 of U.S. patent application Ser. No. 12/755,163 filed Apr. 6, 2010. Said U.S. Patent Application Ser. No. 61/211,977 and U.S. patent application Ser. No. 12/755,163 are herein incorporated by reference.

BACKGROUND

Combustion engines are commonly utilized for propulsion in vehicles and portable machinery. Conventional combustion engines have relied on the combustion of a fuel, typically a fossil fuel with an oxidizer, such as air, in a combustion chamber. As fuel costs have increased, engine performance and fuel efficiency have become a consideration.

A consequence of use of a combustion engine is a resultant emission produced by the combustion engine. Emissions of a combustion engine, also known as exhaust, may refer to the waste material produced by the combustion engine. Exhaust may include a plurality of gases, liquids and particulate matter. The plurality of gases that are part of the exhaust of a combustion engine may include water vapor, carbon monoxide, carbon dioxide, sulfur oxide, sulfur dioxide, nitrogen oxide and ozone.

SUMMARY

Accordingly, the present disclosure is directed to an apparatus for reducing engine emissions utilizing multiple types of fuels. In one aspect of the disclosure, apparatus for reducing engine emissions may include a controller which may control delivery of a first fuel to be combined with a second fuel at a combustion chamber of an engine. Controller may be configured to provide a proper amount of the first fuel at the correct point in an engine cycle based upon a current engine performance data.

It is to be understood that both the foregoing general description and the following detailed description are exemplary and explanatory only and are not restrictive of the disclosure as claimed. The accompanying drawings, which are incorporated in and constitute a part of the specification, illustrate an embodiment of the disclosure and together with the general description, serve to explain the principles of the disclosure.

BRIEF DESCRIPTION OF THE DRAWINGS

The numerous advantages of the present disclosure may be better understood by those skilled in the art by reference to the accompanying figures in which:

FIG. 6 depicts an exemplary locomotive application for reducing emissions;

FIG. 7 depicts an exemplary stationary engine system for reducing emissions;

FIG. 8 depicts an isometric view of an exemplary air box; and

DETAILED DESCRIPTION

Reference will now be made in detail to the presently preferred embodiments of the disclosure, examples of which are illustrated in accompanying drawings.

Referring to FIGS. 1-9, embodiments of an apparatus for reducing engine emissions utilizing multiple fuel types is shown. Apparatus for reducing engine emissions may include a controller which may control delivery of a first fuel to be combined with a second fuel at a combustion chamber of an engine. Controller may be configured to provide a proper amount of the first fuel at the correct point in an engine cycle based upon a current engine performance data. Controller may be configured to provide a proper amount of the first fuel based upon the type of fuel utilized in order to increase performance of the engine and reduce emissions of the engine.

It is contemplated that apparatus for reducing engine emissions utilizing multiple fuel types may be operable with existing engines and new engines and may be employed with any type of device which may require a combustible engine. For example, apparatus for reducing engine emissions utilizing multiple fuel types may be implemented in vehicles such as automobiles, motorcycles, trucks, construction machines, agricultural machines, boats, ships, aircraft and the like. Apparatus for reducing engine emissions may also be implemented with stationary machines, such as engines for irrigation, power generation and the like.

Figure 1:
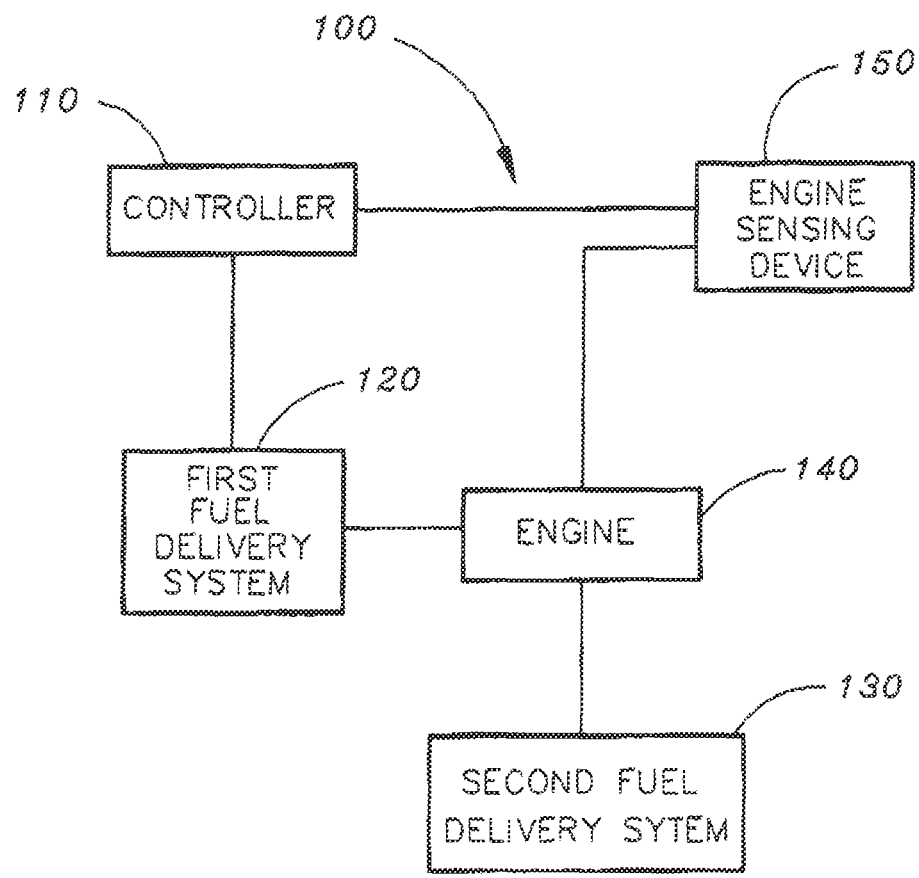
FIG. 1 depicts a block diagram of an apparatus for reducing engine emissions utilizing multiple types of fuel.

Referring to FIG. 1, a block diagram of an apparatus 100 for reducing engine emissions utilizing multiple fuel types is shown. Apparatus 100 may include a controller 110, a first fuel delivery system 120 controlled by controller 110, a second fuel delivery system 130, an engine 140 and an engine sensing device 150. Controller 110 may control operation of first fuel delivery system 120 to provide a proper amount and delivery of a first fuel to a combustion chamber of engine 140 which may be combined with a second fuel provided by second fuel delivery system 130 into the combustion chamber of the engine 140.

Controller 110 may control first fuel delivery system 120 to provide a proper amount of the first fuel to the engine at appropriate timing intervals. Controller 110 may control first fuel delivery system 120 based upon data provided by engine sensing device 150, and thus may advantageously control the first fuel delivery system 120 based upon near real-time data. Engine sensing device 150 may be a control unit for engine 140 and may include one or more sensors which measure an engine performance data. It is contemplated that engine sensing device 150 may be configured to measure engine revolutions per minute (RPM), engine temperature, engine oil temperature, crankshaft position, camshaft position, intake manifold temperature, engine exhaust gas temperature return temperature, turbo boost pressure, exhaust gas temperature, fuel pulse width length, throttle position, fuel pump pressure, common rail high pressure fuel line, low water pressure switch, coolant level, injector pulse signal, fuel pump position, engine performance and the like.

In one embodiment of the disclosure, engine 140 may be a diesel engine whereby apparatus 100 may be operable with an existing diesel engine system which includes second fuel delivery system 130, engine 140 and engine sensing device 150. In such an embodiment, apparatus 100 may operate as a retrofit system to reduce emissions of an existing diesel engine. Advantageously, apparatus 100 may operate with an existing diesel engine system to reduce emissions and allow the overall engine system to be in compliance with more strict exhaust constraints.

It is contemplated that first fuel may be an alternative fuel. First fuel may refer to a low cetane fuel. Low cetane fuel may be a fuel which has a characteristic to not self-ignite under compression. The second type of fuel which may be used in a multiple fuel engine system may refer to a self-igniting fuel under compression, such as diesel fuel and biodiesel fuel. Diesel fuel may not require a spark plug to ignite at compression in a diesel engine due to its heat generation characteristic when compressed. When diesel fuel may be compressed, it may ignite itself. Diesel fuel typically has a chemical composition of $C_{14}H_{30}$.

A first fuel, which may have a characteristic to not self-ignite under compression, may be any type of low cetane fuel. A cetane number may refer to an ignition quality of a fuel and may measure a fuel's ignition delay. An ignition delay may refer to a time period between a start of injection and the beginning of combustion for the fuel. In a diesel engine, higher cetane fuels may have shorter ignition delay periods than lower cetane fuels. Low cetane fuels may include ethanol, methanol, gasoline, propane, methane or natural gas, and any combination of the ethanol, methanol, gasoline, propane, methane and natural gas. It is further contemplated that water may be added to any fuel of the low cetane fuels and may be employed as the first fuel in operation of the apparatus 100 for reducing engine emissions. In one embodiment, depending upon environmental considerations such as ambient temperature, water may be utilized as the first fuel to be combined with diesel fuel to effectively reduce NOx emissions.

In one embodiment, first fuel may be an ethanol blended fuel which may include a mixture of ethanol and water. It is contemplated that first fuel may be 60% ethanol and 40% water, but an ethanol proof of 0 to 200 may be utilized as the first fuel. Ethanol blended fuel may be advantageous for its cost reductions compared to other fuels, increased engine efficiency, and reduced emissions. It is contemplated that apparatus 100 employing use of an ethanol blended fuel with diesel fuel may be in compliance with Department of Environmental Protection Agency (EPA) Tier 3 and Tier 4 emission standards for new engines as well as in-use' off road and/or highway diesel engines.

In alternative embodiments, apparatus 100 may include a first fuel tank and a second fuel tank. First fuel delivery system 120 may be coupled to a first fuel tank and second fuel delivery system 130 may be coupled to a second fuel tank in order to transfer fuel from the respective fuel tanks to engine 140. In the application of a stationary machine, such as an irrigation system, first fuel delivery system 120 may be coupled with a first fuel service system. For example, first fuel may be natural gas whereby first fuel delivery system 120 is coupled to a natural gas service system. First fuel delivery system 120 may include a fuel pump and may include one or more fuel injectors which may inject first fuel into engine 140. Second fuel delivery system 130 may include a fuel pump and may include one or more fuel injectors configured to inject second fuel into engine 140.

Figure 2:
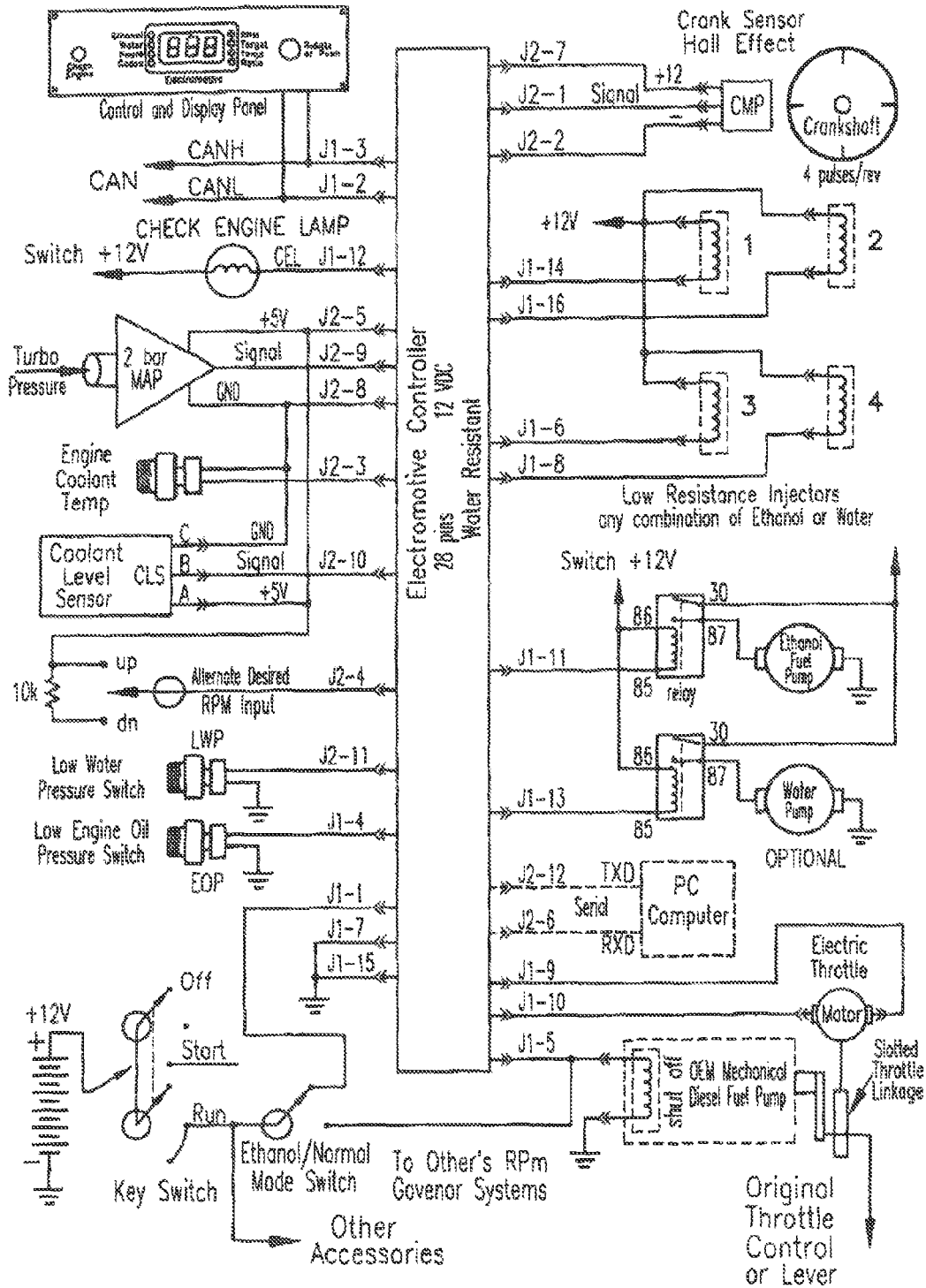
FIG. 2 depicts a diagram of a controller.
Figure 3:
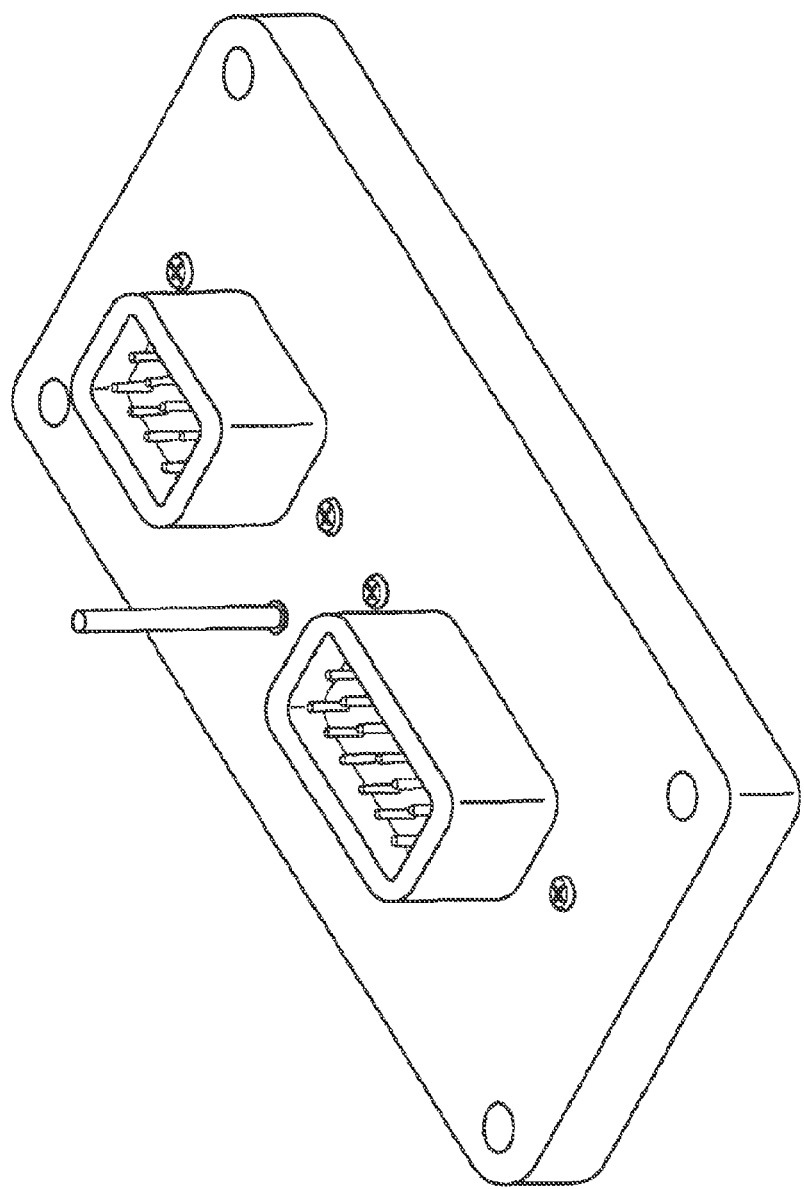
FIG. 3 depicts an exemplary housing of a controller.

Referring to FIG. 2, a diagram of a controller 110 is shown. It is contemplated that controller 110 may include a processing unit, such as a processor and memory for storage of a program of instructions executable by the processing unit. Controller 110 may operate in multiple modes based upon the types of fuel employed by engine 140. For example, controller 110 may operate in a first mode based upon use of a first type of first fuel and first type of second fuel and may operate in a second mode based upon use of a second type of first fuel and a second type of second fuel. In one embodiment, engine sensing device 150 may include a fuel sensor which may determine types of fuels currently being delivered to engine 140. Controller 110 may receive fuel type information from a fuel sensor and place the controller into a proper mode of operation based upon the fuel type information. In another embodiment, controller 110 may include an interface whereby fuel type information may be entered and received by controller 110 through the interface. Controller 110 may be implemented within a housing which may include an 8-pin plug and a 12-pin plug to allow easy installation as shown in FIG. 3.

Figure 5A:
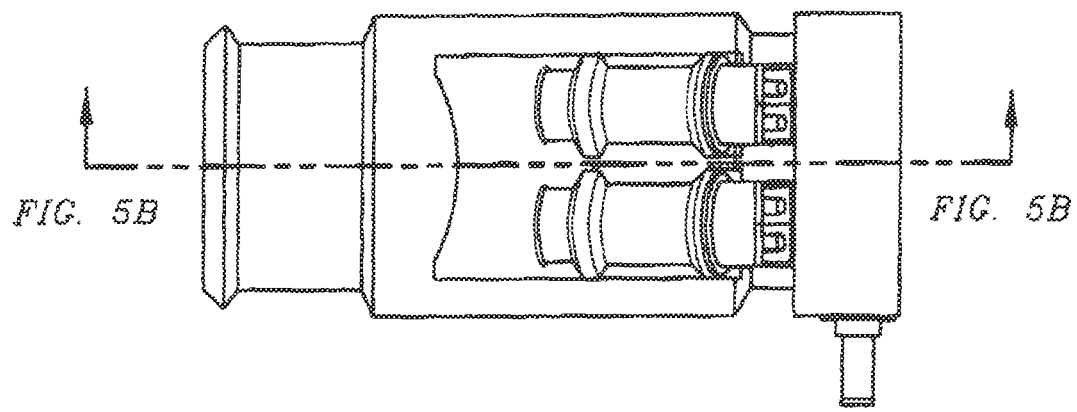
FIG. 5A depicts an exemplary injector bracket.
Figure 5B:
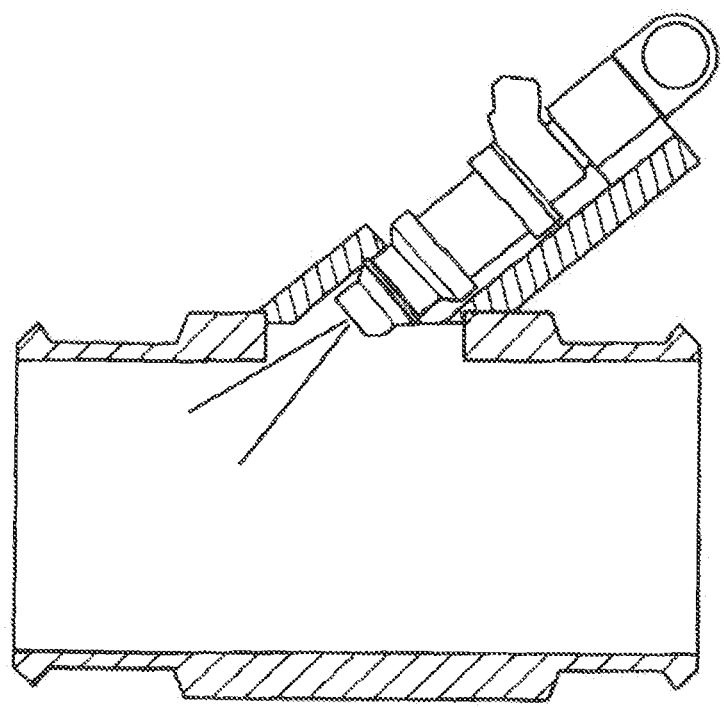
FIG. 5B depicts an exemplary injector bracket.

Engine combustion may occur by providing diesel fuel as the second fuel into the combustion chamber and then adding the first fuel into the air intake of engine 140. The first fuel may enter the combustion chamber as a lean homogeneous fuel/air mixture. It is contemplated that engine 140 may provide ignition through homogeneous charge compression ignition (HCCI) which may reduce nitrous oxide (NOx) emissions in grams per brake horsepower hour. First fuel may be added to the combustion chamber through induction to the air intake of engine 140. In alternative embodiments, second fuel may be provided to the combustion chamber through injection and induction. Induction of the second fuel may further reduce NOx emissions and particulate matter. Induction of the second fuel may be provided by injecting the second fuel at an angle and close to intake ports to allow port fuel induction. Referring to FIGS. 5A and 5B, exemplary brackets for injectors may be employed to orientate the fuel injectors to allow for port fuel induction.

Apparatus 100 may be configured for delivery of the first fuel and the second fuel into a combustion chamber of engine 140 while controlling timing of first fuel injection degree of crank angle (Tp) and duration of first fuel which determines volume of first fuel per specific engine cycle (Dp) by controller 110 in a manner which maximizes HCCI performance while reducing emissions. Controller 110 may avoid auto-ignition and may monitor engine levels to deliver an appropriate amount of first fuel at an appropriate time to reduce emissions.

Depending upon the availability and cost of various types of fuels, controller 110 may be properly programmed and may include one or more inputs to allow selection of a fuel type in order to control delivery of a fuel to increase engine efficiency and reduce emissions. In one embodiment, diesel fuel utilized by engine 140 may have a specific injection timing which may or may not be controlled electronically to optimize maximum HCCI inducted first fuel volumes, ratios of injected vs. inducted fuel BTU contributions and efficiency benefits associated with HCCI. Apparatus 100 for reducing emissions may provide versatility to utilize a variety of fuel types into contemporary diesel engines so as to permit the first fuel to become thoroughly distributed and mixed with the second fuel in the combustion chamber and vaporized prior to ignition. This may reduce fuel costs as well as reduce emissions of nitrous oxide (NOx). The diesel fuel may include a reduced auto-ignition temperature may be ignited by compression ignition, followed by the ignition of the homogeneous mixture of the first fuel and air. HCCI combustion of the inducted fuel may be facilitated by 1) selection of the properties of the first fuel and second fuel 2) obtaining a homogenous mixture of the first fuel and the second fuel having highly evaporative cooling physical properties as first fuel mixtures into the engine's intake air stream in the form of finely atomized droplets which evolve into fog (less than 1 micron) into a mostly homogenous fuel/air mixture ready for an ignition event of heterogeneous injected diesel.

It is contemplated that with different types of engines, a minimum level of the first fuel may be from zero percent to a maximum level of 99.3% to achieve maximum rated horsepower, such as newly developed high pressure common rail electronic fuel injected diesel engines. In older, mechanical fuel injected engines, a maximum level of the first fuel may be about 90% to 95% of the energy source needed for power generation.

Most conventional diesel engines use direct fuel injection methods which cause a stratified air and fuel mixture which when ignited by auto-ignition, causes high levels of soot and NOx. By using a mostly homogeneous, pre-mixed fuel/air composition, reduced combustion temperatures may be possible in comparison to a substantially heterogeneous stratified mixture. This reduced temperature of combustion in the engine 140 may emit a reduced level of NOx in grams per pound of fuel per horsepower hour.

Along with the benefit of reduced combustion temperature of HCCI vs. stratified fuel mixtures, use of alcohols and alcohol/water mixtures as the first fuel having a low cetane value which exhibit a lowered rate of heat release in comparison with injected diesel fuel within a combustion environment may further reduce NOx emissions. Use of the alcohol and alcohol/water first fuel may provide further cooling of the combustion temperatures. By reducing combustion temperatures, additional efficiency may be facilitated through reduced power input for radiator cooling by a reduction in fan speed by sensing engine coolant needs. Electronic controlling of fan speed may provide power and fuel savings in terms of reduced cooling needs.

Figure 4:
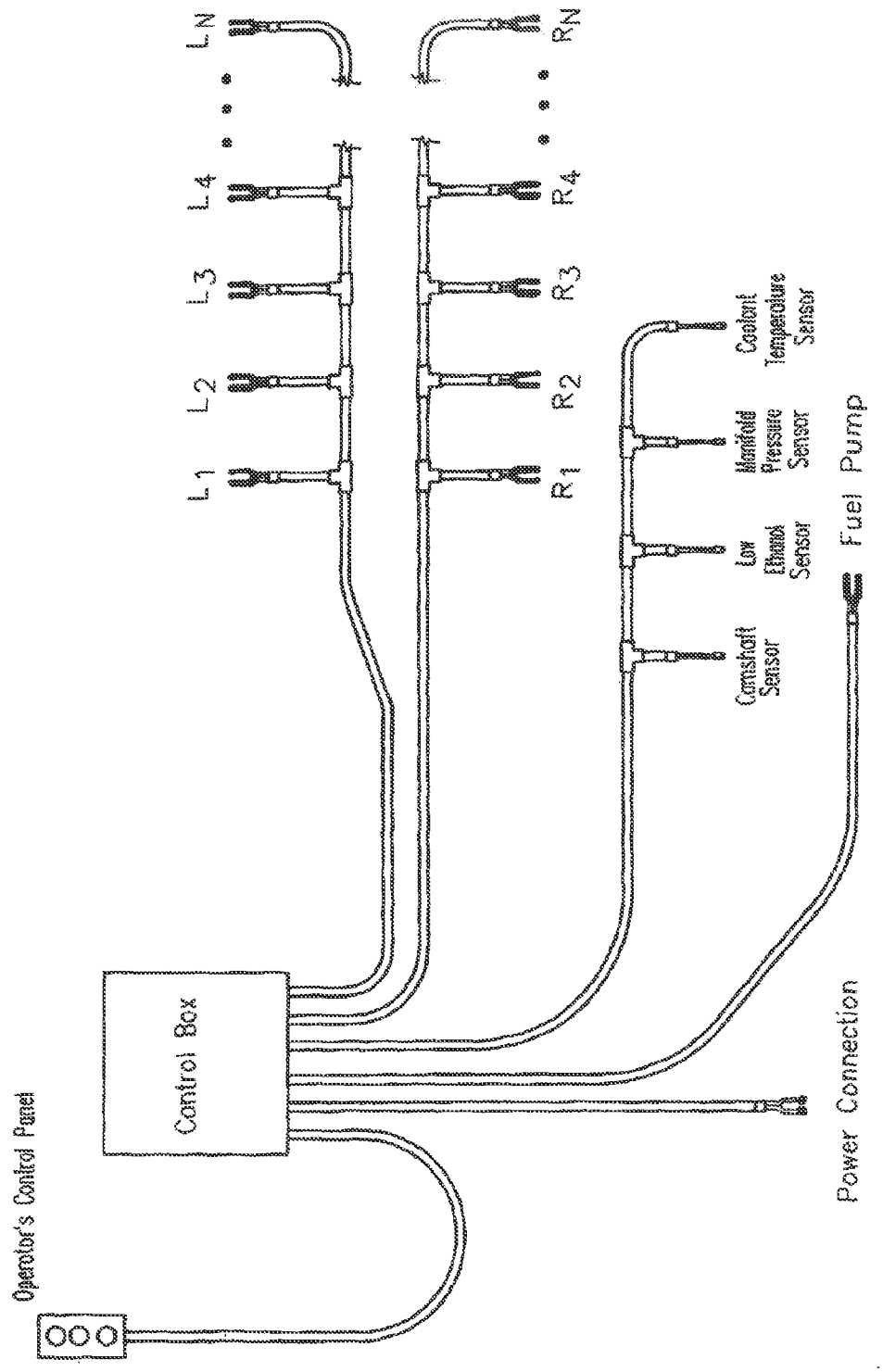
FIG. 4 depicts an exemplary apparatus for reducing engine emissions suitable for a locomotive application.

Referring to FIG. 4, an exemplary diagram of apparatus 100 for reducing engine emissions is shown. Apparatus 100 may employ a camshaft sensor, low ethanol sensor, manifold pressure sensor and coolant temperature sensor to monitor engine performance and may utilize the data from the sensors to control operation of first fuel delivery system 120 via the plurality of injectors. For example, first fuel may be provided when the camshaft sensor is at a threshold position, the manifold pressure sensor is at a threshold pressure and the coolant temperature sensor is at a threshold temperature. Additionally, first fuel delivery may be stopped if the ethanol sensor is below a threshold volume.

Controller 110 may include a jake brake control interface (JBCI). Controller 110 may be configured to stop first fuel intake induction when an engine brake (also known as a jake brake) is switched on. This may prevent fuel waste during braking and may eliminate potentially damaging upper cylinder pressures during braking Jake brake control interface may include an injector control relay triggered by controlling wire lead actuated by a low amperage signal wire. The JBCI may activate the injector control relay located between a high amperage power source and common positive wire lead. The injector control relay may be utilized to control the injectors for processes independent of the jake brake control interface. The injector control relay may switch power to an off position when the JBCI is activated.

Controller 110 may include a minimum turbo boost pressure switching system. Minimum turbo boost pressure switching system may include measurement of turbo boost that typically run between 0 and 30 PSI on most current engine designs via a voltage range. A mass air pressure sensor may have an accompanying output of 0 to 5 volts vs. the 0 to 30 PSI pressure measurements. When a measured voltage level of 0-5 volt MAP sensor reaches a sufficient voltage output based on turbo boost pressure measurement, the injector control relay may be activated. When the injector control relay may be activated, first fuel delivery into intake manifold based on pre-programmed injector pulse width (IPW) outputs may be executed. First fuel injection may be controlled based upon turbo boost levels, which may parallel engine load levels.

In an alternative embodiment, a pressure switch may be included whereby the pressure switch may activate the injector control relay when the pressure switch measures a pressure of a threshold pressure, such as 12 PSI. The use of a pressure switch may accommodate a range of engine load levels whereas the on set of first fuel delivery into the engine may be performed in an emission reducing strategy.

Controller 110 may be coupled with a throttle position sensor. Typically, engines may be controlled by a hand or foot pedal which may activate desired throttling to an engine. A throttle position sensor may emit a voltage which is proportional to the throttle position, for example, a 0-5 Volt signal which could be measured. Controller 110 may receive the voltage signal from the throttle position sensor and may control the first fuel delivery system accordingly. Use of mass air pressure sensor and a throttle position sensor may provide a prescribed ratio of first fuel to second fuel in a fuel delivery curve which may monitors and responds to actual second fuel injection volumes. The signals may be independently provided to controller 110. This may prevent damage to an existing diesel engine original equipment manufacturer (OEM) electronic control unit and may prevent tampering. A engine temperature sensor may also be independently utilized whereby the first fuel delivery would be initiated upon the engine temperature rising above a threshold temperature. Transient engine operations found especially in inner city diesel engines may require fast acting and accurate introductions of a first fuel to eliminate momentary and/or sustained emissions of NOx and particulate matter and may be provided by controller 110 reacting to inputs of the mass air pressure sensor and throttle position sensor.

Apparatus 100 may include a fuel integrity sensor. Employing a water soluble fuel tank comprised of low cetane fuel mixture alongside an oil soluble diesel fuel tank storing a high cetane fuel mixture may present a safety issue. For example, oil soluble liquid (possibly diesel fuel or gasoline fuel) is accidently added to the low cetane fuel tank, a potentially dangerous and/or damaging scenario could occur within the operation of engine 140. A fire may be caused by 'back firing' within the intake manifold of engine 140. Also, pre-detonation of the high cetane fuel mixture could damage engine 140. Whether accidental or via an act of vandalism, a fuel integrity sensor may monitor a composition of a fuel tank regarding oil soluble components. In one embodiment, a conductivity sensor may be located at the lowest fluid level within a first fuel storage tank. A conductivity sensor may provide a voltage signal to controller 110 based upon the type of fuel.

In one embodiment of this disclosure, apparatus 100 may provide for reduction or exclusion of urea as a reductant source in certified OEM or retrofit (in-use) diesel engine designs using selective catalytic reduction (SCR). Additionally, exhaust gas recirculation (EGR) volume may be reduced through operation of apparatus 100. EGR volumes in cubic feet per minute represent power and efficiency robbing schemes to reduce NOx emissions. Controller 110 may be configured to data-log volumes of diesel fuel (fossil fuel) replaced by qualifying alternate fuels as defined by the EPA in a mass weight accountability, which may be reported on appropriate federal and state forms for possible carbon credits. Engine hours, overall diesel fuel use and all other summary reports typical of the SAE J1939 standard may be captured and incorporated into an educational and evolving transition from greenhouse gas causing fossil fuel use, high NOx emitting diesel engines to a cleaner, more environmentally sensitive HCCI fuel use market.

It is contemplated that condensates of diesel fuel or other high boiling point fuels that may accumulate in air intake of engine 140 may be collected through placement of collection holes positioned in segments of specific shapes and designs of various engine models' air intake manifolds. These collection holes may drain off accumulated excess diesel fuel via pressures created by a turbo charger (typically 5 to 20 PSI depending on engine configuration) and re-introduce into fuel pump line or pre-turbo induction methods. This may be necessary to avoid sudden and violent 'burping' of uneven and excessive accumulated volumes of diesel fuel into the combustion chamber during engine operation. In a fuel transfer scenario, due to the nature of the accumulated fuel mixture possibly having alcohols, gasoline or other low cetane fuels co-mingled as a result of the HCCI fumigation, a small fuel amount may be re-cycled and utilized as it is collected. A nozzle may be placed in front of the turbo due to the lowered pre-turbo intake air tube pressures. Turbo boost pressure may push the condensate fuel mixture to the other side of the turbo and safely render this potential disaster situation impossible. This process may distribute scavenged fuel through a small spraying system nozzle (8001 VS) placed 4 to 12 inches in front of the turbo-charger. Small volumes of fuel may be metered to avoid turbo fin damage due to the low expected fuel return volumes coupled with small spray droplets having approximately 1 micron-'fog' to 10 microns-'ultra fine droplets' in size via droplet size reduction via evaporation of fuel mixture within air intake tube.

Referring to FIG. 6, it is contemplated that apparatus 100 for reducing engine emissions may be implemented within a locomotive. It is contemplated that the first fuel may be placed within a storage tank rail car located in proximity with the locomotive. This may allow a locomotive to be retrofitted with apparatus to reduce emissions. Referring to FIG. 7, apparatus 100 for reducing engine emissions may be implemented within a stationary engine system. It is contemplated that the first fuel may be placed within a storage tank or alternatively may be provided by a fuel service.

It is contemplated that controller 110 may operate first fuel delivery system to provide first fuel through injector pulses with intake cycle events of traditional diesel 4 cycle and 2 cycle engines. Apparatus 100 may employ throttle body injection (TBI) within proportionality with engine intake valve opening events. Injectors of the first fuel delivery system may be configured to actuate upwards to 6,000 times per minute. When two injectors may be paired together, the two pair of injectors may be configured to provide 12,000 fuel pulses per minute, which accommodates engine ranges of 6000 revolutions per minute. After maximum pulsation range occurs, the pair of injectors may be at nearly 100% duty cycle, which may be a near continuous flow of the first fuel. It is contemplated that controller can alter the cycle of pulses in frequency and duration (injector pulsation lengths in milliseconds) which may affect volumes of fuel metered at any exact moment.

First fuel delivery system may allow for throttle body injection or port fuel injection. Injectors may include a spray pattern which may provide for a mile per hour mph spray pattern speed. Because the injectors may start and stop an injection sequence rapidly, the controller 110 may provide for near real-time response according to engine data and ensure optimal engine performance while reducing emissions. The spray pattern provides a more homogeneous air/fuel mixture. Controller 110 is configured to control first fuel delivery system to provide a wide range of inducted first fuel versus injected diesel fuel. This range may be programmed from 0 to 99.7%.

In one specific embodiment shown in FIG. 8, a fuel delivery system 800 apparatus for reducing engine emissions utilizing at least one fuel type is shown mounted on an air box 802. In implementations, an air box 802 can include an engine intake manifold that directs fresh air to the engine intake valves and/or ports. In the embodiment illustrated in FIG. 8, the fuel delivery system 800 apparatus for reducing engine emissions includes two fuel delivery systems and multiple fuel intakes 806, where either of the fuel delivery systems can be configured to deliver the first fuel and/or the second fuel. However, the fuel delivery system 800 may include only one fuel delivery system and/or fuel intakes or the fuel delivery system 800 may include more than two fuel systems and/or fuel intakes. In this embodiment, the fuel delivery system(s) can be mounted to the air box 802 using a bracket 804, which can include an object or system used to support the fuel delivery system 800 or a portion of the fuel delivery system 800. One example of multiple fuel delivery systems and a bracket 804 can include the systems and brackets as shown in FIGS. 5A and 5B. In some implementations, the bracket(s) 804 can include materials such as metal (e.g., aluminum, steel, alloys, etc.), a composite material (e.g., glass-ceramic matrix, heat-resistant, etc.), glass, ceramic, as well as other materials that can be configured to support the fuel delivery system 800.

Figure 9:
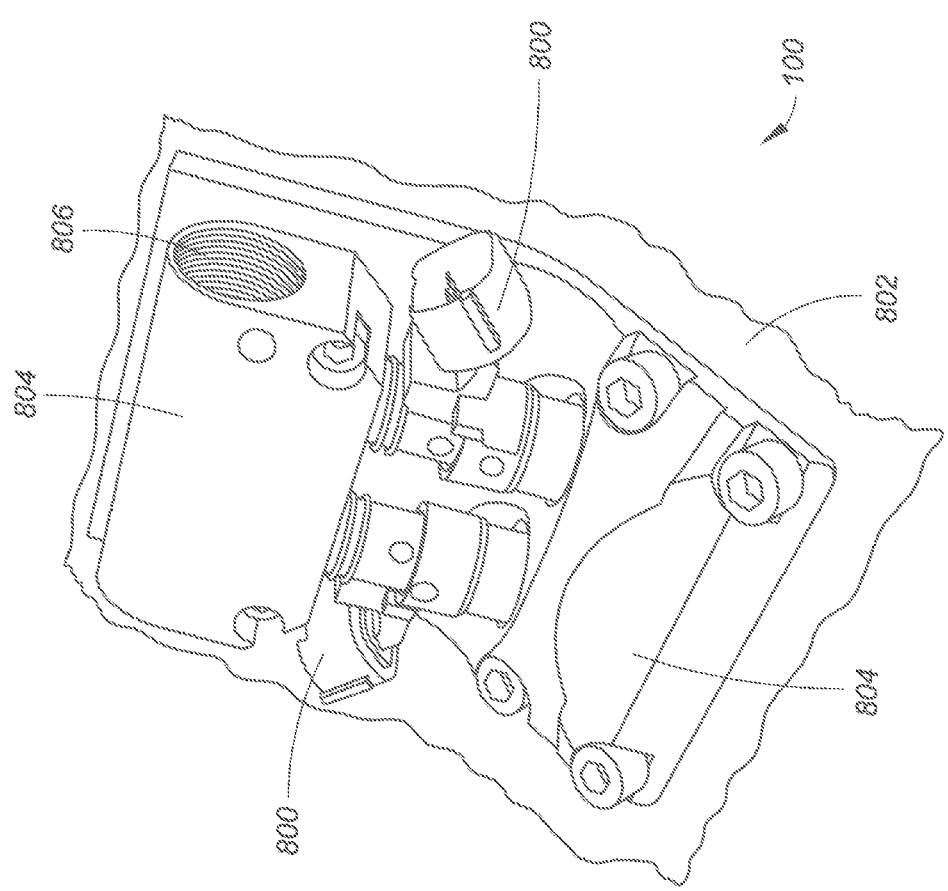
FIG. 9 depicts a partial isometric view of an exemplary air box.

In implementations, the fuel delivery system 800 can be mounted to the air box 802 such that the system can deliver the fuel at an angle into the air box 802. For example, the fuel delivery system can be mounted to an air box 802 such that fuel is delivered to the air box 802 at a 45° angle. Other angles may also be implemented (e.g., 0° to 180°). FIG. 9 illustrates a partial isometric view of the fuel delivery system 800 coupled to the air box 802 using a bracket 804. In some embodiments, the air box 802 can be included in a locomotive engine, a diesel engine, a biofuel engine (e.g., biodiesel, bioethanol, etc.), or other type of engine.

In a general sense, those skilled in the art will recognize that the various aspects described herein which can be implemented, individually and/or collectively, by a wide range of hardware, software, firmware, and/or any combination thereof can be viewed as being composed of various types of electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the apparatus of the present disclosure and many of its attendant advantages will be understood by the forgoing description. It is also believed that it will be apparent that various changes may be made in form, construction, and arrangement of the components thereof without departing from the scope and spirit of the invention or without sacrificing all of its material advantages. The form herein before described being merely an explanatory embodiment thereof.

What is claimed is:

1. An apparatus for reducing engine emissions utilizing multiple types of fuels, comprising;
   a controller, configured to avoid auto-ignition and configured to provide real-time response;
   a first fuel delivery system coupled to said controller, said first fuel delivery system being configured to provide a first fuel to an engine, wherein said controller is configured to control operation of said first fuel delivery system to deliver a proper amount of the first fuel at a proper time in an engine cycle to the engine, said controller being configured to receive engine data regarding said engine and determine the proper amount of first fuel and said proper time in the engine cycle based upon said engine data, wherein said engine is configured to operate with said first fuel including diesel fuel; and
   a second fuel delivery system coupled to the controller and configured to provide a second fuel at an angle at a location proximate to at least one intake port, where the second fuel includes a mixture of ethanol and water;
   where the first fuel delivery system and the second fuel delivery system are coupled to an air box using a bracket.

2. The apparatus as claimed in claim 1, further comprising an engine sensing device coupled to said controller.

3. The apparatus as claimed in claim 2, wherein said engine sensing device provides said engine data to said controller.

4. The apparatus as claimed in claim 3, wherein said engine sensing device includes an electronic control unit of said engine.

5. The apparatus as claimed in claim 3, wherein said engine sensing device includes a mass air pressure sensor which is configured to measure turbo boost pressure of said engine.

6. The apparatus as claimed in claim 5, wherein controller initiates said first fuel delivery system to provide said first fuel to said engine when said turbo boost pressure is greater than a threshold pressure.

7. The apparatus as claimed in claim 1, wherein said first fuel delivery system includes a fuel pump and a plurality of injectors coupled to said fuel pump.

8. The apparatus as claimed in claim 1, wherein said first fuel includes a low cetane fuel.

9. The apparatus as claimed in claim 1, wherein said first fuel includes ethanol.

10. The apparatus as claimed in claim 1, wherein said first fuel includes an ethanol and water mixture.

11. An apparatus for reducing engine emissions utilizing multiple types of fuels, comprising:
    a controller;
    an engine sensing device coupled to said controller; and
    a first fuel delivery system coupled to said controller, said first fuel delivery system being configured to provide a first fuel to an engine, wherein said controller is configured to control operation of said first fuel delivery system to deliver a proper amount of the first fuel at a proper time in an engine cycle to the engine, said controller being configured to receive engine data from said engine sensing device regarding said engine and determine the proper amount of first fuel and said proper time in the engine cycle based upon said engine data from said engine sensing device, wherein said engine is configured to operate with said first fuel and diesel fuel;
    where the first fuel delivery system is coupled to an air box using a bracket.

12. The apparatus as claimed in claim 11, wherein said engine sensing device includes an electronic control unit of said engine.

13. The apparatus as claimed in claim 11, wherein said engine sensing device includes a mass air pressure sensor which is configured to measure turbo boost pressure of said engine.

14. The apparatus as claimed in claim 13, wherein controller initiates said first fuel delivery system to provide said first fuel to said engine when said turbo boost pressure is greater than a threshold pressure.

15. The apparatus as claimed in claim 11, wherein said first fuel delivery system includes a fuel pump and a plurality of injectors coupled to said fuel pump.

16. The apparatus as claimed in claim 11, wherein said first fuel includes a low cetane fuel.

17. The apparatus as claimed in claim 11, wherein said first fuel includes ethanol.

18. The apparatus as claimed in claim 11, wherein said first fuel includes an ethanol and water mixture.

19. An apparatus for reducing engine emissions utilizing multiple types of fuels, comprising:
    a controller;
    a mass air pressure sensor coupled to said controller;
    a throttle position sensor coupled to said controller; and
    an ethanol fuel delivery system coupled to said controller, said ethanol fuel delivery system being configured to provide ethanol to an engine, wherein said controller is configured to control operation of said ethanol fuel delivery system to deliver a proper amount of ethanol fuel at a proper time in an engine cycle to the engine, said controller being configured to receive engine data from said mass air pressure sensor and said throttle position sensor, wherein said controller is configured to control operation of said ethanol fuel delivery system to deliver ethanol to said engine when at least one of a threshold pressure has been measured by said mass air pressure or a threshold level of throttle has been measured by said throttle position sensor,
where the ethanol fuel delivery system is coupled to an air box using a bracket.

* * * * *